(12) United States Patent
Culliinane et al.

(10) Patent No.: US 6,178,983 B1
(45) Date of Patent: Jan. 30, 2001

(54) RUPTURE DISK ASSEMBLY

(75) Inventors: Donall Culliinane, Limerick; John Daly, Cootehill, both of (IE); Stephen Farwell, Owasso, OK (US); Barry Lowe, Limerick (IE); Mitch Rooker, Sand Springs; John Tomasko, Claremore, both of OK (US)

(73) Assignee: BS&B Safety Systems, Inc., Tulsa, OK (US)

( * ) Notice: Under 35 U.S.C. 154(b), the term of this patent shall be extended for 0 days.

(21) Appl. No.: 09/310,848

(22) Filed: May 13, 1999

(51) Int. Cl.[7] .................................................. F16K 17/40
(52) U.S. Cl. ..................................... 137/68.26; 137/68.21; 137/68.27; 220/89.2
(58) Field of Search .............................. 137/68.19, 68.21, 137/68.25, 68.26, 68.27; 220/89.2

(56) References Cited

U.S. PATENT DOCUMENTS

| | | |
|---|---|---|
| 3,526,336 | 1/1969 | Wood . |
| 3,834,580 | 9/1974 | Ludwig et al. . |
| 3,921,556 | 11/1975 | Wood et al. . |
| 4,072,160 | 2/1978 | Hansen . |
| 4,158,422 | 6/1979 | Witten et al. . |
| 4,211,334 | 7/1980 | Witten et al. . |
| 4,236,648 | 12/1980 | Wood et al. . |
| 4,301,938 | 11/1981 | Wood et al. . |
| 4,388,940 | 6/1983 | Powell . |
| 4,404,982 | 9/1983 | Ou . |
| 4,436,218 | 3/1984 | Beese . |
| 4,597,505 | 7/1986 | Mozley et al. . |
| 4,669,626 | 6/1987 | Mozley . |
| 4,674,530 | 6/1987 | Bickford . |
| 4,759,460 | 7/1988 | Mozley . |
| 5,005,722 | 4/1991 | Short, III et al. . |
| 5,082,133 | 1/1992 | Farwell et al. . |
| 5,094,266 | 3/1992 | Ledbetter . |
| 5,167,337 | 12/1992 | Short, III et al. . |
| 5,267,666 | 12/1993 | Hinrichs et al. . |
| 5,305,775 | 4/1994 | Farwell . |
| 5,368,180 | 11/1994 | Farwell et al. . |
| 5,411,158 | 5/1995 | Kays et al. . |
| 5,467,886 | 11/1995 | Hinrichs . |
| 5,558,114 | 9/1996 | Strelow . |
| 5,774,372 | 6/1998 | Berwanger . |
| 5,782,259 | 7/1998 | Ledbetter et al. . |
| 6,006,938 | * 12/1999 | Mozley et al. ...................... 220/89.2 |

OTHER PUBLICATIONS

Continental Disc Corporation, Certified $K_R$ Flow Resistance Factors for Pressure Relief Design, 1987.
Pressure Relief Devices, ASME PTC 25–1994, Performance Test Codes, An American National Standard, *The American Society of Mechanical Engineers*, Jan. 31, 1995.

* cited by examiner

*Primary Examiner*—John Rivell
(74) *Attorney, Agent, or Firm*—Finnegan, Henderson, Farabow, Garrett & Dunner, L.L.P.

(57) ABSTRACT

An improved rupture disk assembly for a pressure relief system is disclosed. The rupture disk assembly is sealed between an inlet support member and an outlet support member, each of which define a central fluid pathway. A rupture disk that includes a flange connected to a dome-shaped rupturable portion by a transition area is sealed between the support members. The rupturable portion may include an indentation positioned at the apex of the dome and a score line having a first and a second end. A safety member that has a hinge including a knuckle and a tongue is positioned between the rupture disk and the outlet support member. The knuckle extends downwardly into the dome and extends laterally across the dome to a point that is inside the area circumscribed by the score line or inside the area circumscribed by an arc connecting the two ends of the score line. The rupture disk assembly of the present invention provides a low flow resistance $K_r$ in both gas and liquid applications, a low damage safety ratio, and a high operating capacity.

56 Claims, 5 Drawing Sheets

RUPTURE DISK ASSEMBLY

BACKGROUND OF THE INVENTION

This invention relates to pressure relief systems. More particularly, the present invention relates to an improved rupture disk assembly for a pressure relief system.

Pressure relief assemblies are commonly used as safety devices in systems containing pressurized fluids in gas or liquid form. A pressure relief assembly will vent fluid from the system when the pressure in the system reaches an unsafe level. A number of emergency conditions, including fire and system failure, can create dangerous pressure levels, which require immediate relief to preserve the safety of the system.

Generally, a pressure relief assembly includes a rupture disk that is sealed between a pair of support members, or safety heads. The pressure relief assembly is then typically clamped, or otherwise sealingly disposed, between a pair of conventional pipe flanges in the pressurized system. One of the pipes conducts pressurized fluid to one side of the pressure relief assembly and the other pipe provides an outlet to a safety reservoir or may be open to the environment. The support members include a central opening that exposes a portion of the rupture disk to the pressurized fluid in the system. The exposed portion of the rupture disk will rupture when the pressure of the fluid reaches a predetermined differential pressure between the inlet and outlet sides. The ruptured disk creates a vent path that allows fluid to escape through the outlet to reduce the pressure in the system.

Rupture disks typically have a dome shape and can be either forward acting or reverse acting. In a forward acting disk, the concave side of the dome faces the pressurized fluid, placing the material of the disk under tension. In a reverse acting disk, the convex side of the dome faces the pressurized fluid, placing the material of the disk under compression. In the reverse acting disk (also known as a reverse buckling disk), when the pressure of the fluid exceeds the predetermined level and the material of the disk structure cannot withstand the pressure, the dome of the disk will buckle and begin to reverse. This reversal, or buckling, will begin at a particular point on the disk, known as the point of initial reversal. As the disk continues to reverse, the material of the disk is torn by an opening means to create the vent path to release the pressurized fluid.

Both types of disks commonly include score lines (areas of weakness) to facilitate the opening of the disk. In a reverse buckling disk, the disk will tear along the score line when the disk is reversing. Selected portions of the disk are usually left unscored, acting as a hinge area, to prevent the disk from fragmenting upon bursting and escaping along with the pressurized fluid. Additionally, pressure relief assemblies are known that include safety members to assist in opening the disk and to absorb the energy created by the bursting of the disk to attempt to prevent the disk from fragmenting.

In an emergency situation, where the system pressure becomes unsafe, it is important to reduce the pressure as quickly as possible. The American Society of Mechanical Engineers (ASME) code establishes minimum performance requirements for fluid flow rates through pressure relief systems. The size and shape of the opening created when the disk bursts is a limiting factor on the rate at which fluid can escape the system. A burst disk having a large, unobstructed opening will perform better than a burst disk having a small, obstructed opening because the velocity head loss (i.e. pressure drop) over the large, unobstructed opening will be lower than the velocity head loss over a smaller or obstructed opening. The lower velocity head loss translates to a lower flow resistance ($K_r$) and, thus, a greater flow rate through the disk.

Adjusting different facets of the disk design, including the size of the rupturable portion of the disk and the location of the score line, can control the size and shape of the opening created when the disk bursts. A larger disk has the potential to create a larger opening.

Another factor affecting flow resistance is the nature of the fluid in the pressurized system. It has been found that rupture disks open differently depending on the nature of the fluid in the system. Typically, a disk burst in a gas environment will open more fully than a disk burst in a liquid environment. Thus, to meet desirable flow resistance performance requirements, the design of a disk may have to be different if the disk is being used in a liquid application, even if the liquid is at the same pressure as a similar gas application.

An additional factor of disk design that affects flow resistance is the thickness of the rupturable portion of the disk. A disk made of a thinner material will bend easier than a disk made of a thicker material. Thus, for disks rupturing at the same fluid pressure, a thinner disk is more likely to completely open and create a large, unobstructed opening than a corresponding thicker disk.

However, a disk made of a thinner material is more susceptible to damage than a thicker disk. Any damage to the rupture disk could alter the actual burst pressure of the disk. This is particularly an issue in low pressure, reverse buckling disks where the disk material must be thin to burst at the desired low pressure. If the disk is damaged during installation, the structural integrity of the disk may be compromised causing the disk to reverse at a pressure significantly less than the desired rupture pressure. In these situations, the material of the disk does not tear as expected and the disk may completely reverse without tearing. The reverse buckling disk then acts like a forward acting disk and the fluid pressure places the material of the disk in tension. Because the tensile strength of the disk material is greater than the corresponding compressive strength, the disk may not tear to create the vent path until the pressure of the system significantly exceeds the desired rupture pressure. This over-pressure condition could result in damage to the system that the rupture disk was intended to prevent.

Rupture disks are rated by their performance in a damaged condition. This rating is generally known as the damage safety ratio of the disk and is determined by dividing the actual pressure at which a damaged disk ruptures by the desired, or rated, rupture pressure of the disk. A damaged disk with a damage safety ratio of 1 or less will burst at the desired rupture pressure, or before the pressurized fluid reaches the desired pressure, thereby preventing any damage to the system.

Another important performance rating of a rupture disk is the burst accuracy of the disk. There are variations in materials, manufacturing, and installation that may result in any given two disks in a manufacturing lot of seemingly identical disks not bursting at the same pressures. Thus, there is typically a variation in actual burst pressure among disks having the same rated pressure. With current rupture disk design and manufacturing methods, rupture disks will typically burst at a pressure that is ±5% of the rated pressure or ±2 psig when the rated pressure is below 40 psig. Thus, to prevent premature disk rupture and to provide a safety margin, the standard operating pressure of a system should not exceed 90% of the rated pressure of a rupture disk used in the system.

In light of the foregoing, there is a need for a pressure relief assembly that provides a low flow resistance $K_r$ in both liquid and gas applications. There is further a need for rupture disks that have an accurate and repeatable burst pressure and thus can be used in a high operating capacity. There is still further a need for a rupture disk having a low damage safety ratio so that an inadvertently damaged reverse buckling disk does not create a potentially dangerous over-pressure situation in either liquid or gas applications.

SUMMARY OF THE INVENTION

Accordingly, the present invention is directed to a pressure relief assembly that obviates one or more of the limitations and disadvantages of prior art pressure relief assemblies. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a pressure relief assembly that includes an inlet support member that defines an inlet bore for conducting a pressurized fluid and an outlet support member that defines an outlet bore for relieving the pressurized fluid. There is also provided a rupture disk that has a rupturable portion and a flange. The rupturable portion has a convex surface and a corresponding concave surface that define a dome area. The flange is sealingly engaged between the inlet and outlet support members to align the concave surface with the outlet bore and the convex surface with the inlet bore. The rupturable portion further includes a score line having a first and a second end that creates a line of weakness along which the rupturable portion will tear when the pressurized fluid exceeds a predetermined level. There is further provided a safety member disposed between the rupture disk and the outlet support member. The safety member includes a flange and a hinge that has a knuckle that extends downwardly into the dome area and extends laterally across the dome area to a point that is inside the area circumscribed by the score line or inside the area circumscribed by an arc connecting the two ends of the score line. The hinge also includes a tongue extending from the knuckle into the outlet bore in a direction generally perpendicular to the flange of the safety member.

In yet another aspect, the invention is directed to a rupture disk assembly to be sealed in a pressurized system. The rupture disk assembly includes a rupture disk that has a dome-shaped rupturable portion that includes a convex surface and a corresponding concave surface that define a dome area. The rupturable portion further includes a score line that creates a line of weakness along which the rupturable portion will tear when the rupturable portion is exposed to a fluid above a predetermined pressure. There is further provided a safety member disposed adjacent the concave surface of the rupture disk. The safety member includes a flange and a hinge that has a knuckle that extends downwardly into the dome area and extends laterally across the dome area to a point that is inside the area circumscribed by the score line. The hinge also includes a tongue extending from the knuckle into the outlet bore in a direction generally perpendicular to the flange of the safety member.

In another aspect of the rupture disk assembly, the hinge includes a first pocket adjacent to the first end of the score line and a second pocket adjacent to the second end of the score line. The pockets are configured to contact the area of the rupturable portion adjacent the respective ends of the score line when the rupture disk ruptures.

In yet another aspect of the rupture disk assembly, the rupture disk includes a line of weakness having a first and a second end. The rupture disk will tear along the line of weakness when the rupture disk is exposed to a fluid above a predetermined pressure. There is further provided a safety member disposed adjacent the concave surface of the rupture disk. The safety member includes a flange and a hinge that has a knuckle that extends downwardly into the dome area and extends laterally across the dome area to a point that is inside the area circumscribed by the line of weakness or inside the area circumscribed by an arc connecting the two ends of the line of weakness. The hinge also includes a tongue extending from the knuckle into the outlet bore in a direction generally perpendicular to the flange of the safety member.

In still another aspect of the rupture disk assembly, the rupture disk assembly further includes an outlet support member and the hinge includes a tongue support that extends from the tongue to a point adjacent the outlet support member.

According to still another aspect, the present invention is directed to a pressure relief assembly that has an inlet support member defining an inlet bore for conducting a pressurized fluid and an outlet support member defining an outlet bore for relieving the pressurized fluid. There is further provided a rupture disk having a rupturable portion that forms a dome that has a concave surface and a convex surface. The rupture disk also includes a flange that surrounds the rupturable portion for sealing engagement between the inlet and outlet support members such that the dome extends into the inlet bore. The dome has an indentation formed at the apex of the dome. The indentation has substantially the same thickness as the surrounding portion of the dome and creates a structural weakness in the rupturable portion at which the rupturable portion will initiate reversal when the pressurized fluid exceeds a predetermined limit.

According to yet another aspect, the present invention is directed to a rupture disk for sealing engagement in a system containing a pressurized fluid. The rupture disk has a rupturable portion that forms a dome that has a concave surface and a convex surface. The rupture disk also includes a flange that surrounds the rupturable portion and is configured for sealing engagement with the pressurized system to expose the convex surface of the rupturable portion to the pressurized fluid of the system. An indentation is formed at the apex of the dome. The indentation has substantially the same thickness as the surrounding portion of the dome and creates a structural weakness in the rupturable portion at which the rupturable portion will initiate reversal when the pressurized fluid exceeds a predetermined limit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Reference will now be made in detail to the presently preferred embodiments of the present invention, examples of which are illustrated in the accompanying drawings. Wherever possible, the same reference numbers will be used throughout the drawings to refer to the same or like parts. An exemplary embodiment of a pressure relief assembly of the present invention is shown in FIG. 1 and is designated generally by reference number 20.

In accordance with the present invention, there is provided a pressure relief assembly that includes an inlet support member that defines an inlet bore for conducting a pressurized fluid, an outlet support member that defines an outlet bore for relieving the pressurized fluid, and a rupture disk. The rupture disk has a rupturable portion including a convex surface and a corresponding concave surface that defines a dome area. The rupture disk also includes a flange for sealing engagement between the inlet and outlet support members to align the concave surface with the outlet bore and the convex surface with the inlet bore. In the illustrated embodiments, the pressure relief assembly is depicted as a pretorqued pressure relief assembly. It is contemplated, however, that the present invention may also be used with non-pretorqued pressure relief assemblies or as a component of a welded assembly.

Figure 1:
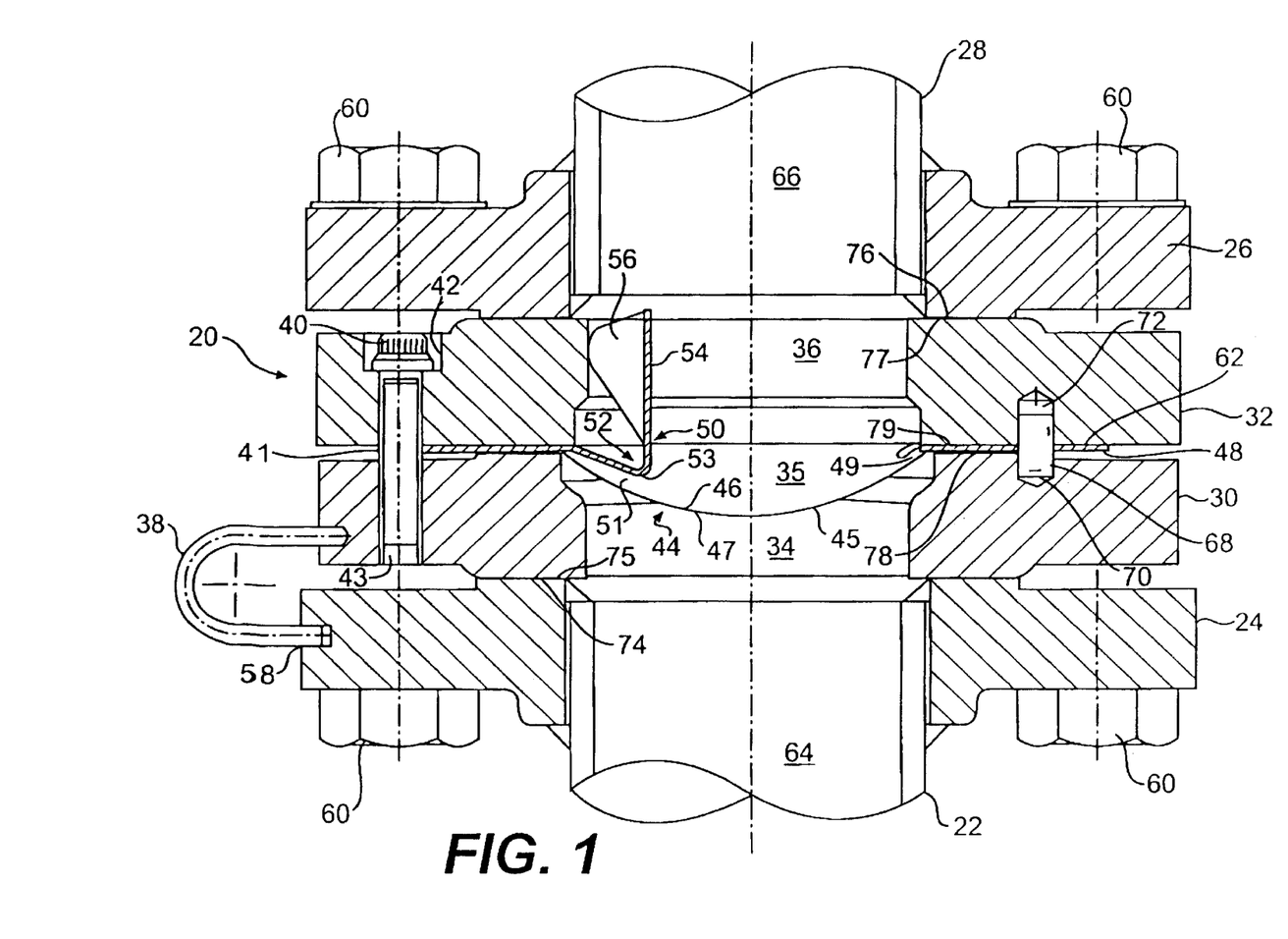
FIG. 1 is a cross sectional view of a pair of support members and a rupture disk according to the present invention positioned between a pair of pipe flanges.

As embodied herein and as illustrated in FIG. 1, pressure relief assembly 20 includes an inlet support member 30 and an outlet support member 32. Inlet support member 30 defines an inlet bore 34 and has a series of internally threaded bolt holes 43 (only one of which is illustrated in FIG. 1) surrounding the inlet bore. Outlet support member 32 defines an outlet bore 36 and has a series of bolt holes 41 (only one of which is illustrated in FIG. 1) that correspond to bolt holes 43 of inlet support member 30. It is contemplated that the inlet and outlet support members may be safety heads, pipe flanges, or any combination of structures capable of sealingly engaging the rupture disk with a pressurized system.

As also shown in FIG. 1, a rupture disk 44 is positioned between inlet support member 30 and outlet support member 32. Rupture disk 44 includes a flange 48 and a rupturable portion 45. Flange 48 is connected to rupturable portion 45 by transition area 49. It is contemplated that the rupture disk and safety member of the present invention can also be utilized in sanitary environments, wherein well-known sanitary fittings will be utilized to engage the rupture disk.

Rupturable portion 45 has a dome shape that includes a concave surface 46 and a convex surface 47 that define a dome area designated generally as 35. When flange 48 is engaged with inlet and outlet support members 30 and 32, rupturable portion 45 aligns with inlet bore 34 and outlet bore 36. In a preferred embodiment, convex surface 47 extends into inlet bore 34 and concave surface faces outlet bore 36. It is contemplated, however, that aspects of the present invention may be utilized in forward acting disks where the convex surface extends into the outlet bore.

Figure 2:
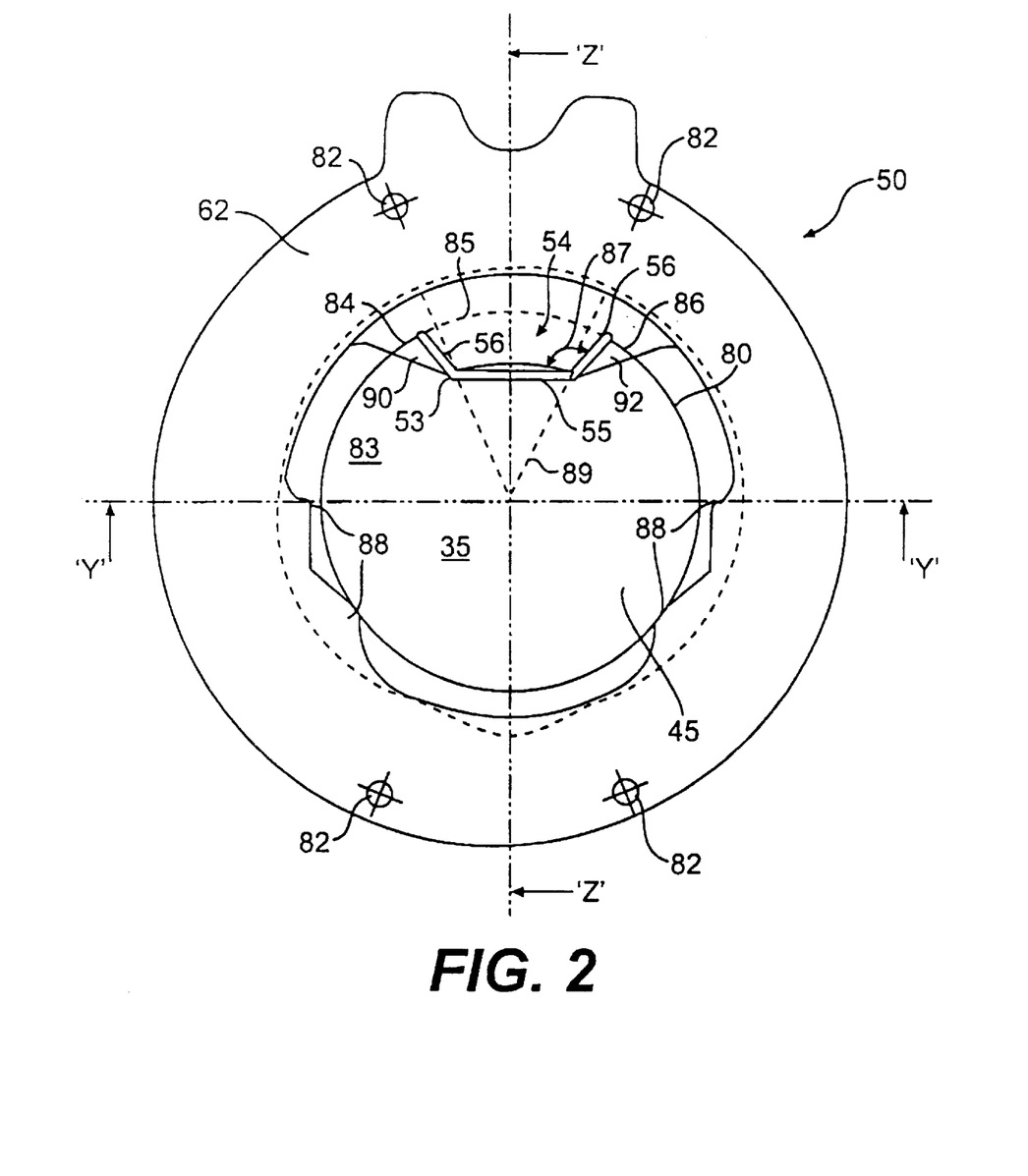
FIG. 2 is a top view of a rupture disk and a safety member according to the present invention.

As illustrated in FIG. 2, rupturable portion 45 includes a score line 80 that has a first end 84 and a second end 86. Preferably, score line 80 transcribes an arc of approximately 300° in the concave surface of the dome-shaped rupturable portion. The present invention can be utilized with score lines of various configurations, such as, for example, an intermittent score line where the score generally transcribes an arc, but includes a series of gaps of unscored material. The score line may also completely circumscribe the rupturable portion of the disk, but include a section where the depth of the score line is shallower than the remainder of the score line. For purposes of the present invention, the points at which the depth of the score line changes would be considered to be the first and second ends of the score line.

As described in greater detail below, score line 80 creates a line of weakness in the rupturable portion along which the disk material will tear when exposed to a fluid having a predetermined pressure. While the presently preferred embodiment provides the score line on the dome itself, the score line may be provided in other locations, such as, for example, the transition area between the dome and the flange of the disk or on the flange itself.

Referring again to FIG. 1, a positioning pin 68 preferably extends between inlet support member 30 and outlet support member 32 and through flange 48 of rupture disk 44. Positioning pin 68 ensures that inlet support member 30 is properly aligned with outlet support member 32 and that rupture disk 44 is properly positioned between support members 30 and 32. When the assembly is properly positioned, inlet bore 34 aligns with outlet bore 36 to create a fluid passageway that is blocked by rupturable portion 45 of rupture disk 44. Additional positioning pins may be placed in a symmetrical or asymmetrical pattern around the support members to further control the relative positions of the rupture disk and support members.

A series of cap screws 40 (only one of which is illustrated in FIG. 1) are disposed through bolt holes 41 to engage internally threaded bolt holes 43. Preferably, bolt holes 41 in outlet support member 32 include a counter bore 42 to receive the head of cap screw 40. The engagement of cap screws 40 with bolt holes 41 and 43 draws outlet support member 32 towards inlet support member 30 to sealingly engage flange 48 of rupture disk 44.

Preferably, inlet support member 30 includes a raised seating surface 78 and outlet support member 32 includes a corresponding seating surface 79 to engage flange 48 of rupture disk 44. It is contemplated that seating surface 78 may include a bite seal, or other similar sealing device, to create a seal with the flange. Alternatively, an o-ring or gasket may be positioned between inlet support member 30 and flange 48 to create the seal.

As is shown in FIG. 1, pressure relief assembly 20 is positioned between a circular inlet pipe 22 and a circular outlet pipe 28. Inlet pipe 22 includes an inlet fluid pathway 64 and an inlet pipe flange 24. Outlet pipe 28 includes an outlet fluid pathway 66 and an outlet pipe flange 26.

Preferably, inlet pipe flange 24 includes a raised surface 74 that engages a corresponding surface 75 on inlet support member 30 and outlet pipe flange 26 includes a raised surface 76 that engages a corresponding surface 77 on outlet support member 26. A series of bolt members 60 draw inlet pipe flange 24 towards outlet pipe flange 26 to create a seal with the pressure relief assembly 20.

Preferably, a U-shaped positioning fixture 38 extending from inlet support member 30 engages an opening 58 in inlet pipe flange 24 to ensure pressure relief assembly 20 is properly oriented between the pipe flanges. U-shaped positioning fixture 38 also ensures that inlet support member 30 is placed adjacent inlet pipe flange 24 and, thus, prevents pressure relief assembly 20 from being installed upside down in the pipe flanges. Pressure relief assembly 20 is properly positioned between inlet pipe flange 24 and outlet pipe flange 26 when inlet fluid pathway 66 aligns with inlet bore 34, outlet bore 36, and outlet fluid pathway 66 to create a fluid passageway that is blocked by rupturable portion 45 of rupture disk 44.

Inlet pipe 22 is connected to a system or vessel (not shown) that contains a pressurized fluid. The fluid may be in either gas or liquid form. Inlet pipe 22 conducts the pressurized fluid to pressure relief assembly 20 and the exposed rupturable portion 45 of rupture disk 44. Rupturable portion 45 is configured to burst when the pressure of the fluid reaches a predetermined level that is indicative of an over-pressurization in the system or vessel. The burst pressure of the disk may be controlled by varying different parameters of the disk design, including, but not limited to, the height of the domed section, the thickness of the disk, and the depth and location of the score line.

When the disk bursts and tears along score line 80, an opening through the disk is created. The opening allows the fluid to flow from inlet bore 34 to outlet bore 36 and into outlet fluid pathway 66, thereby reducing the pressure in the system or vessel. Outlet fluid pathway 66 may release the fluid to the environment or to a safety reservoir (not shown) depending upon the nature of the fluid in the system or vessel.

In accordance with the present invention, the pressure relief assembly includes a safety member disposed adjacent the concave surface of the rupture disk. The safety member includes a hinge having a knuckle that extends downwardly into the dome area created by the rupturable portion of the disk and extends laterally across the dome area to a point that is inside the area circumscribed by the score line or inside the area circumscribed by an arc connecting the two ends of the score line. A tongue extends away from the knuckle and into the outlet bore of the outlet support member in a direction generally perpendicular to the flange of the safety member.

As illustrated in FIG. 1, a safety member 50 is positioned between rupture disk 44 and outlet support member 32 and generally supports the transition area of the rupture disk. Preferably, safety member 50 is a separate structure from rupture disk 44 and from outlet support member 32. It is contemplated, however, that safety member 50 may be integral with or connected to either rupture disk 44 or outlet support member 32 with spot welds or in any other manner to keep the structures together.

Safety member 50 includes a flange 62 and a hinge 52. Flange 62 of safety member 50 has substantially the same general shape as flange 48 of rupture disk 44 and is sealed in pressure relief assembly 20 between the rupture disk flange and outlet support member 32. Preferably, as shown in FIG. 2, flange 62 includes a series of holes 82 that may be engaged by positioning pin 68 (referring to FIG. 1).

Figure 3A:
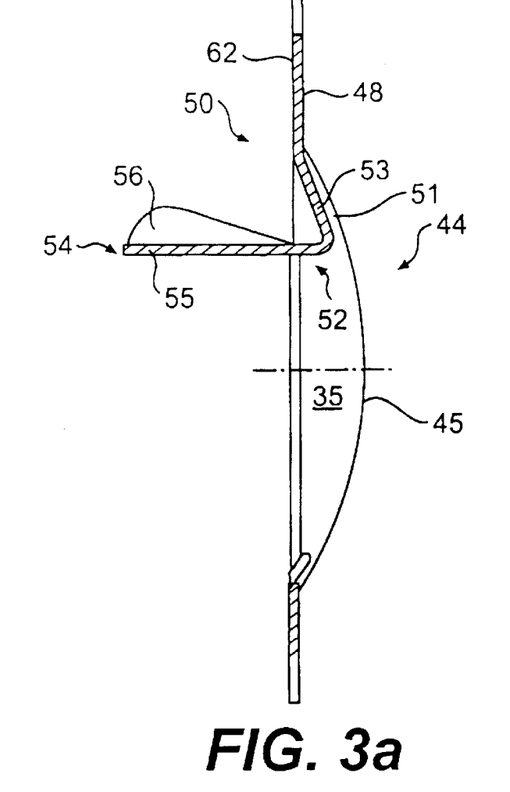
FIG. 3a is a cross sectional view of the rupture disk and safety member of FIG. 2, taken along line Z—Z.

As shown in FIG. 3a, hinge 52 includes a knuckle 53 and a tongue 54. Knuckle 53 extends from flange 62 into dome area 35. In the illustrated embodiment, knuckle 53 is linear in cross-section. It is contemplated, however, that knuckle 53 may have other cross-sections, such as, for example, a curved cross-section that generally follows the contour of the rupturable portion. Preferably, knuckle 53 does not contact rupturable portion 45 and, thus, leaves a gap 51 between the knuckle and the rupturable portion. It is contemplated, however, that knuckle 53 may contact rupturable portion 45 when the rupture disk is in an unruptured state.

Referring to FIGS. 1 and 2, the outer edge of knuckle 53 extends downwardly into dome area 35. Outer edge 53 also extends laterally across dome area 35 to a point that is inside the area circumscribed by score line 80 or inside the area circumscribed by an arc connecting the ends 84 and 86 of score line 80. The outer edge of knuckle 53 forms a generally straight line about which the rupturable portion will bend when the rupture disk ruptures. In a presently preferred embodiment, the outer edge 53 extends to a point inside, but directly adjacent to the area circumscribed by the score line 80 or the area circumscribed by an arc 85 connecting the two ends of the score line. This embodiment of the hinge prevents fragmentation, yet maximizes the size of the opening created when the disk ruptures, thereby minimizing the pressure drop, or velocity head loss, over the ruptured disk and achieving a low flow resistance, $K_r$.

Figure 4:
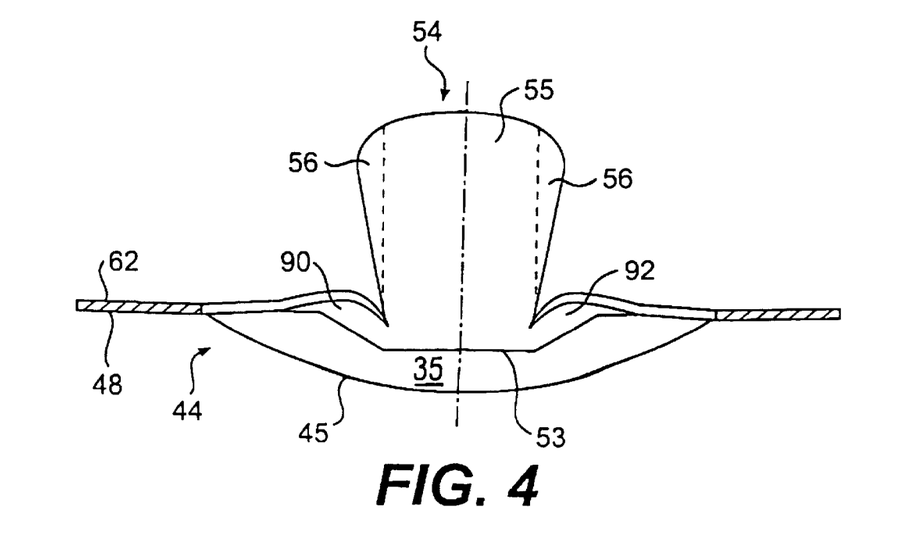
FIG. 4 is a cross sectional view of the rupture disk and safety member of FIG. 2, taken along line Y—Y.

As shown in FIG. 4, hinge 52 is formed with a first pocket 90 and a second pocket 92. First and second pockets preferably have a concave shape that faces gap 51 between knuckle 53 and rupturable portion 45 of rupture disk 44. Preferably, first and second pockets 90 and 92 are positioned adjacent first and second ends 84 and 86 of score line 80, respectively. It is contemplated that first and second ends 84 and 86 of score line 80 may terminate at a point directly below first and second pockets 90 and 92, respectively (as illustrated in FIG. 2). Alternatively, first and second ends 84 and 86 of score line may terminate at a point that is directly aligned with or just short of first and second pockets 90 and 92, respectively.

As illustrated in FIGS. 1–4, tongue 54 extends away from knuckle 53 and into outlet bore 36. Preferably, as shown in FIG. 2, tongue 54 includes a main linear section 55 with two substantially straight side flaps 56 that project from the main linear section 55 towards the outlet safety member 32. Preferably, as shown in FIG. 2, the angle 87 between side flaps 56 and main linear section 55 is obtuse, although the present invention contemplates that angle 87 may be a right angle or an acute angle. More preferably, angle 87 is greater than the angle between main linear section 55 and a line of radius 89 extending through the corresponding end of main linear section 55. Still more preferably, angle 87 is within the range of about 130° to 160°.

In the embodiment illustrated in FIG. 1, side flaps 56 extend towards outlet safety member 32. Preferably, side flaps 56 are in close proximity to, but do not contact outlet safety member 32 when the disk is in an unruptured state.

Figure 3B:
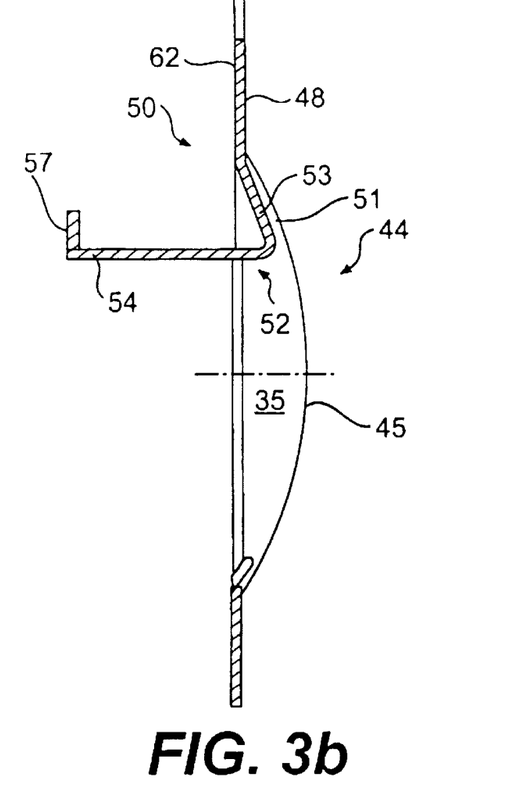
FIG. 3b is a cross sectional view of an alternative embodiment of the rupture disk and safety member of FIG. 2, taken along line Z—Z.

In an alternative embodiment, and as illustrated in FIG. 3b, tongue 54 includes a tongue support 57 that projects from the end of the tongue towards outlet support member 32. Preferably, tongue support 57 extends to a point that is in close proximity to, but not in contact with, outlet support member 32. It is contemplated that other embodiments of the support structure will be readily apparent to one skilled in the art.

Referring to FIG. 2, safety member 50 preferably includes a series of stress risers 88. Each stress riser 88 extends away from flange 62 and into dome area 35 of rupturable portion 45 of the rupture disk. Each stress riser 88 terminates in one or more stress concentrating points. Preferably, the stress concentrating points of at least two of the stress risers are aligned with score line 80 in rupturable portion 45 of the rupture disk. The stress concentrating points, as explained in greater detail below, contact the rupturable portion of the rupture disk when the rupture disk reverses to ensure the rupturable portion tears to create a flow path for fluid to escape.

The safety member may include recessed, or "scalloped out," areas between each stress riser. These "scalloped out" areas create gaps in the support of the transition area of the rupture disk. As also explained in greater detail below, the gaps in the support of the rupture disk also help ensure that the rupturable portion tears to create a flow path for fluid to escape. These scalloped out areas may be located at a few selected locations around the safety member annulus or may alternatively be regularly spaced around the entire annulus or substantially the entire annulus (e.g. exclusive of the hinge area).

As described above and referring to FIG. 1, inlet fluid pathway 64 conducts pressurized fluid, in either gas or liquid form, to inlet bore 34 and to rupturable portion 45 of rupture disk 44. In the illustrated embodiment, the pressurized fluid contacts convex surface 47 of rupture disk 44, thereby placing the material of the disk under a compressive force. The magnitude of the compressive force corresponds to the pressure of the fluid. When the pressure of the fluid reaches a predetermined level and the compressive force exceeds the structural and material strength of the rupturable portion of the rupture disk, the dome-shaped section will begin to buckle, or reverse.

Figure 5:
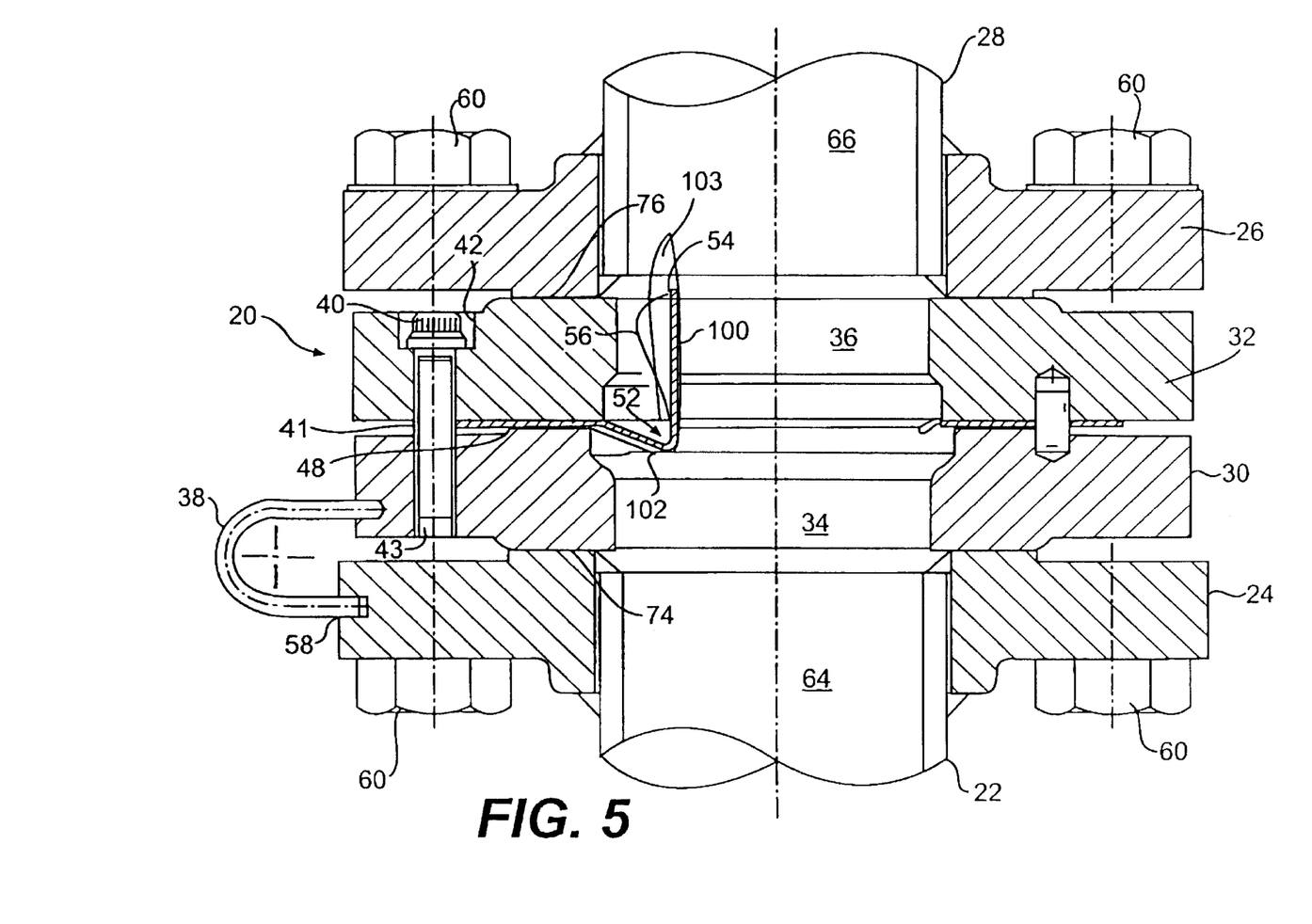
FIG. 5 is a cross sectional view of a pair of support members and a rupture disk according to the present invention positioned between a pair of pipe flanges, illustrating the rupture disk in a burst state.

As illustrated in FIG. 5, the reversal of the disk will cause the disk to tear along score line 80 to form a disk petal 103 that has a shape defined by score line 80 and a disk hinge 102 that connects disk petal 103 to flange 48 to prevent the disk from fragmenting. Under the continued fluid pressure, disk hinge 102 will bend, with respect to the flange, through gap 51 towards safety member 50. Because knuckle 53 of safety member 50 is close to disk hinge 102, the momentum gained by the disk hinge will be relatively small and will be arrested by the eventual contact with the knuckle before the disk petal gains enough momentum to tear away from the disk hinge.

If the disk does not tear along the score line during the initial buckling of the disk, the disk will continue to buckle and reverse under the pressure of the fluid until the disk contacts the stress concentrating points of stress risers 88. The stress concentrating points will increase the stress in the score line 80 to facilitate opening of the disk. In addition, the unsupported gaps of the transition area, as defined by the shape of the "scalloped out" areas of the safety member, create additional forces in the rupturable portion of the disk to ensure the disk opens to create a vent path for the fluid.

After the rupturable portion tears and the disk hinge 102 is supported by knuckle 53, the force of the fluid pressure and the momentum of disk petal 103 will cause the disk to bend around the outer edge of knuckle 53. The petal will continue to bend around knuckle 53 until contacting tongue 54 of hinge 50. The contact of disk petal 103 with tongue 54 will bend the tongue until side flaps 56 contact outlet safety member 32. The portions of disk petal 103 that extend on either side of tongue 54 will wrap around the tongue and contact side flaps 56.

Depending upon the pressure in the system and the momentum with which the petal is moving, tongue 54 and side flaps 56 may further bend and deform with the contact of disk petal 103 to absorb the kinetic energy of the moving disk petal and stop the movement of the disk petal. Preferably, side flaps 56 are angled with respect to the outlet support member so that they may bend outwardly, or inwardly depending upon angle 87, if the force of contact with the moving petal is great enough. By absorbing the kinetic energy of the moving disk petal, the tongue reduces the overall force on the disk petal, thereby preventing the disk petal from fragmenting. The dimensions of the hinge and, in particular, the dimensions of the knuckle and tongue, are selected so that the hinge will effectively absorb the kinetic energy of the disk petal, while achieving a large and unobstructed flow path through which the pressurized fluid may vent.

In the illustrated embodiment, the portions of the disk petal surrounding the end of the score line will fold into pockets 90 and 92 of hinge 50. Pockets 90 and 92 extend generally away from the flange 62 of the safety member and in the direction of the outlet bore. Pockets 90 and 92 have curved surfaces and are configured to receive the portions of the rupture disk adjacent the respective ends 84 and 86 of score line 80 without creating any additional stress concentrating points. The pockets provide support for the rupture disk material adjacent the ends of the score line. This reduces the tensile forces acting on the ends of score line to prevent the tear in the rupture disk from continuing past the ends of the score line. Thus, the pockets help in preventing the petal from completely separating from the disk. In a preferred embodiment, the disk reverses symmetrically and the disk will wrap around the opposing pockets at the same time thereby preventing the creation of any uneven stresses in either side of the disk hinge.

The opening created by the rupture of the disk will be defined by the shape and location of the score line and by the shape and location of the hinge. In the preferred embodiment, the score line and hinge are configured to maximize the size of the opening. It is contemplated that the shape of the hinge, as defined by the first pocket, the second pocket, and the outer edge of the knuckle, may be a generally straight line Alternatively, as illustrated in FIG. 2, the outer edge of the knuckle may be generally straight and the pockets, disposed on either side of the knuckle, may angle towards the flange of the safety member.

In the preferred embodiment and as illustrated in FIG. 4, the outer edge of the knuckle 53 includes a generally straight section that is located at a point minimally inside the ends of the score line 80. The straight section may be inside, but directly adjacent to the area 83 circumscribed by the score line 80. Alternatively, the straight section may be inside, but directly adjacent to the area transcribed by an arc 85 connecting the ends 84 and 86 of score line 80. The line 85 appears for purposes of illustration in the drawings and does not actually appear on the disk.

When disk petal 103 bends around the outer edge 53 of hinge 50, the bending portion of the petal will preferably form a generally straight line between the ends 84 and 86 of score line 80. Thus, a maximal portion of disk petal 103 will bend out of the fluid passageway. In this manner, the size of the opening created when the disk ruptures is maximized.

Another factor in obtaining a large and unobstructed opening in all service conditions is controlling the initial reversal point of the disk. The initial reversal point of the disk is the point at which the disk initially buckles under the force of the pressurized fluid. In one preferred embodiment, the initial reversal point is positioned at the apex of the dome shaped rupturable portion. This is the position on the rupturable portion that is the furthest from the transition area of the disk. Initiating reversal at this point will ensure that the disk petal will optimally engage the score line and other opening features to tear open and bend completely around the disk hinge to maximize the size of the opening.

In accordance with the present invention, the dome of the rupturable portion includes a structural apex formation, which is preferably an indentation formed at the apex of the dome. The indentation creates a structural weakness in the rupturable portion at which the rupturable portion will initiate reversal when the pressure of the pressurized fluid exceeds a predetermined limit.

Figure 6:
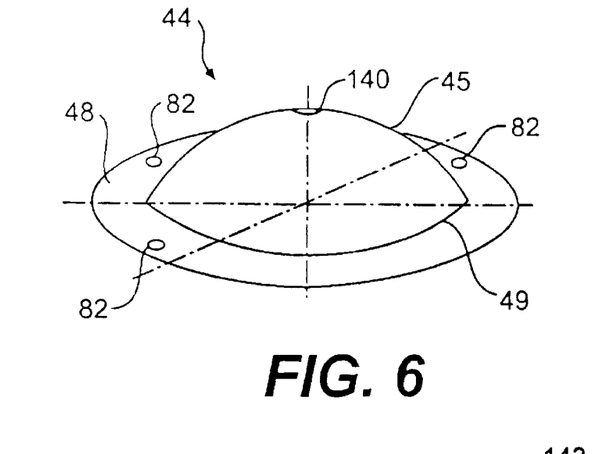
FIG. 6 is a perspective view of a rupture disk having a central indentation according to the present invention.
Figures 7, 8, 9:
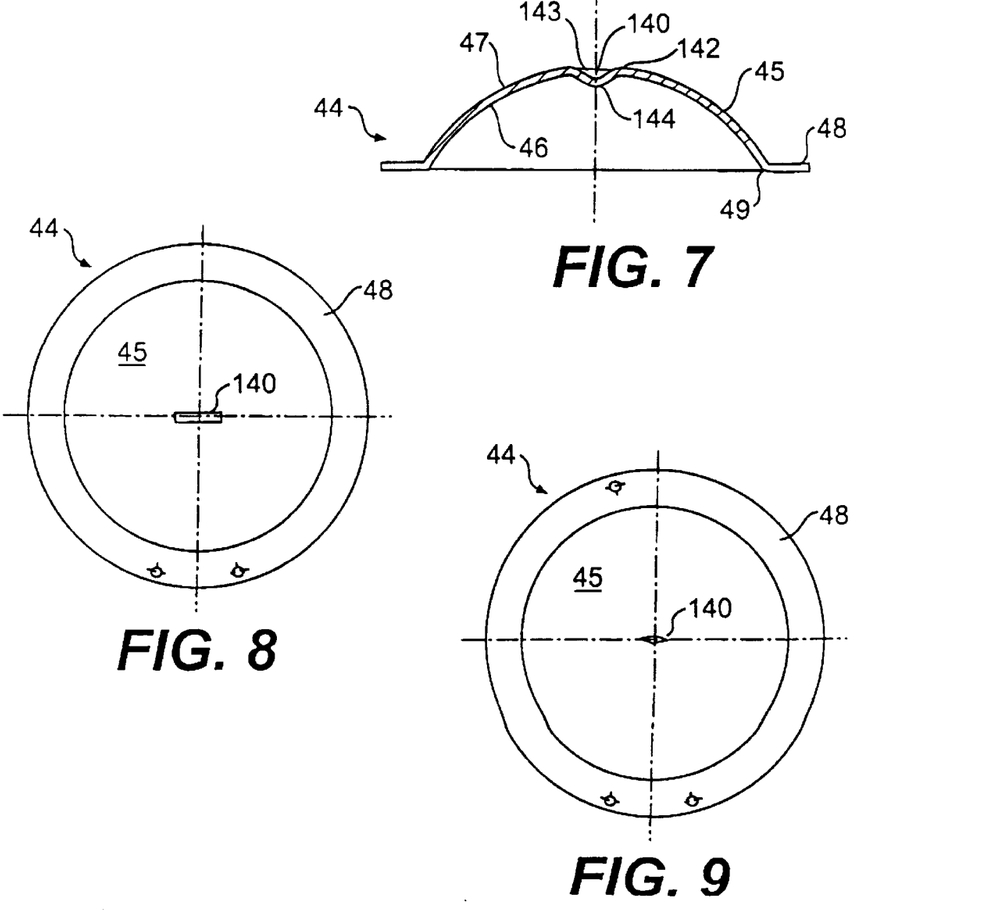
FIG. 7 is a cross sectional view of the rupture disk of FIG. 6.
FIGS. 8 and 9 are top plan views of alternative embodiments of central indentations according to the present invention.

As shown in FIGS. 6 and 7, rupturable portion 45 includes an indentation 140 formed at the apex of the dome of the rupturable portion. It is contemplated that the indentation may be formed in the dome at any point during the manufacture of the disk. As is known in the art, rupture disks are typically manufactured from a flat sheet of material having a desired thickness and material properties. A portion of the flat sheet of material is subject to a pneumatic or hydraulic pressure to form the dome-shaped rupturable portion. It is contemplated that the indentation may be formed in the disk prior to forming the dome, when the disk is in the flat stage. Alternatively, the indentation may also be formed during the process of forming the dome shaped rupturable portion. In addition, the indentation could potentially be formed through a mechanical operation after the rupturable portion is formed.

As illustrated in FIG. 7, indentation 140 has substantially the same thickness as the rupturable portion of the dome that surrounds the indentation. As described above, the rupturable portion of the dome is typically created from a flat sheet of material. The expansion of the flat sheet into the dome shape causes a natural thinning of the disk material from the base of the dome to the apex of the dome. Typically, the area of the rupturable portion adjacent flange 48 is relatively thicker than the area of the rupturable portion at the apex of the dome. It is contemplated that the indentation will have substantially the same thickness as the portion of the dome that immediately surrounds the indentation.

Preferably, as shown in FIG. 7, indentation 140 is formed in convex surface 47 of the dome, creating a cavity 142 in the convex surface 47 and a corresponding nipple-shaped protrusion/dimple 144 in the concave surface 46. Alternatively, indentation 140 may be formed in the concave surface 46 of the dome, creating a cavity in the concave surface 46 and a corresponding nipple-shaped protrusion in the convex surface 47.

As shown in FIG. 7, indentation 140 includes a circular outer edge 146. Preferably, the distance from the outer edge 142 to transition area 49 is the same at all points along outer edge 142 of indentation 140.

As shown in FIGS. 8 and 9, the indentation may have a variety of shapes. For example, as illustrated in FIG. 8, indentation 140 may be a straight line having a midpoint coinciding with the apex of the dome. In addition, as shown in FIG. 9, indentation 140 may include two straight lines that intersect at the apex of the dome.

It has been found, as evidenced in the examples below, that indenting the dome of the disk at the apex in accordance with the present invention improves the burst accuracy of the rupture disk. Rupture disks are manufactured in lots of a given number (typically 5–10 pieces) and all disks within a lot receive a rated rupture pressure based on a statistical sampling of test disks from the same manufacturing lot. Typically, all of the disks within the lot will rupture within 5% of the rated rupture pressure. Thus, to prevent premature rupture of the disk, the operating pressure of the system should not exceed 90% of the rated rupture pressure of the disk. Increasing the accuracy and repeatability of the disk will allow the system to be operated at higher than 90% of the rated pressure of the rupture disk and still achieve an acceptable safety margin.

Rupture disks according to the present invention are considerably more consistent in their actual rupture pressure. The following data represents comparative testing done on rupture disks with and without the indentation formed at the apex:

Burst Accuracy Test:

This burst accuracy testing compares the actual burst pressure of a disk having an indentation according to the present invention with a similar disk without the indentation. Both rupture disks were formed from 0.004" Ni at 275 psig with a 0.190" crown height and a maximum score depth in the dome area.

| Test No. | Actual Burst Pressure of Disk Without Indentation (psig) | Actual Burst Pressure of Disk of Present Invention (psig) |
| --- | --- | --- |
| 1 | 65 | 51.0 |
| 2 | 65.2 | 50.6 |
| 3 | 66.0 | 51.0 |
| 4 | 66.0 | 50.9 |
| 5 | 68.0 | 51.0 |
| 6 | 68.5 | 50.9 |
| 7 | 67.5 | 50.2 |
| 8 | 67.5 | 50.1 |
| 9 | 67.8 | 50.3 |
| 10 | 67 | 50.3 |
| Average Burst Pressure (psig) | 66.85 | 50.63 |
| Range (% of Average Burst Pressure)* | ±2.77% | ±1.05% |
| %3σ** | 5.5% | 2.2% |

*The range represents the greatest deviation from the average burst pressure in terms of a percentage of the average burst pressure.
**Represents three times the standard deviation in actual burst pressures as a percentage of the average rated burst pressure.

As shown in the above testing, a series of indented rupture disks from the same manufacturing lot consistently ruptured within a range of ±1.05% of the average rupture pressure. Thus, a system utilizing a rupture disk according to the present invention may be operated at pressures exceeding 90% of the lot's average rupture pressure and even at pressures up to 95% or more of the lot's average rupture pressure of the disk without increasing the risk of a premature burst of the rupture disk and still provide an acceptable safety margin.

Adjusting other design parameters of the disk, such as, for example, the location of the score line, may provide additional improvements upon the burst accuracy of the disk. The present invention contemplates that a rupture disk having a structural apex formation consistent with the present invention and a score line in the transition area of the disk will also have greatly improved burst accuracy characteristics when compared to the burst accuracy characteristics of conventional rupture disks.

Another benefit of the present invention is a reduced damage safety ratio. The damage safety ratio of a disk is determined by dividing the actual burst pressure of a damaged disk by the rated pressure of the disk. The following data represents the damage ratio of rupture disks made according to the present invention with different types of damage:

Damage Test:

The following damage testing was performed on a 1" rupture disk according to the present invention. This rupture disk was made from 0.004" Ni at 275 psig with a 0.190" crown height. The average burst pressure of the disk was 50.6 psig. According to ASME standards, acceptable burst pressures for the disks may fall within a range of ±5 psig of the average burst pressure. Thus, for the rupture disks of this test, the minimum acceptable burst pressure is 45.6 psig and the maximum acceptable burst pressure is 55.6 psig.

| Damage Type* | Average Burst Pressure (psig) | Actual Burst Pressure (psig) | Damage Ratio |
|---|---|---|---|
| None | 50.6 | 50.5 | 1.00 |
| None | 50.6 | 50.5 | 1.00 |
| Blunt damage** to disk dome behind hinge, so that disk dome contacts midpoint of the knuckle | 50.6 | 51.0 | 1.01 |
| Blunt damage to disk dome behind hinge, so that disk dome does not contact the knuckle | 50.6 | 51.0 | 1.01 |
| Blunt damage to the transition area behind the hinge | 50.6 | 51.0 | 1.01 |
| Blunt damage to the transition area opposite the hinge | 50.6 | 51.0 | 1.01 |
| Sharp damage*** to the transition area behind the hinge | 50.6 | 49.7 | 0.98 |
| Sharp damage to the transition area opposite the hinge | 50.6 | 50.5 | 1.00 |
| Sharp damage to the transition area over one of the stress risers | 50.6 | 51.0 | 1.01 |
| Sharp damage on score line opposite the hinge | 50.6 | 51.0 | 1.01 |
| Blunt damage across score line opposite the hinge | 50.6 | 42.5 | 0.84 |
| Blunt damage across center of dome | 50.6 | 25.0 | 0.49 |
| Sharp damage to dome 3.75 mm from central indentation | 50.6 | 35.0 | 0.69 |
| Sharp damage to dome 7.5 mm from central indentation | 50.6 | 45.0 | 0.89 |

*A disk is considered damaged when the dome of the disk is physically altered to include a feature that is visible on both sides of the rupturable portion of the disk.
**Blunt damage to the disk was inflicted using a generally flat object with a circular profile, for example a hammer with a diameter of approximately 0.75".
***Sharp damage to the disk was inflicted using a tool having a rectangular profiled tip, for example a screw driver with dimensions 0.200" × 0.040".

As shown in the above testing, a rupture disk made in accordance with the present invention has damage safety ratio of less than about 1. Thus, if a rupture disk according to the present invention is damaged prior to or after installation, the disk will still rupture at a pressure that is no greater than the maximum acceptable burst pressure of the disk.

Indenting the disk at the apex of the dome provides other operational benefits. For example, the central indentation ensures that the disk reversal will be symmetrical with respect to the dome. It is contemplated that a symmetrical reversal of the disk creates additional stresses in the score line during reversal, which increases the quality of opening during reversal. It has also been found that when the indentation is at a maximum distance from the score line, the detrimental effect of disk movement during cycling on the score line is reduced. In other words, the fatigue life of the disk can be increased.

As mentioned previously, the disclosed pressure relief assembly may be used in a pressurized system containing either a pressurized gas or a pressurized liquid. In accordance with the present invention, a rupture disk is provided that, when burst, has a low flow resistance, $K_r$, in both a liquid application and a gas application.

The flow resistance, $K_r$, of a rupture disk determines the rate at which the rupture disk will relieve fluid to reduce the pressure of a system. The flow resistance is a function of the pressure drop, or velocity head loss, over the burst rupture disk. A large velocity head loss results in a large $K_r$ and, thus, a lower fluid release rate. The American Society of Mechanical Engineers (ASME), standard ASME PTC 25, have established performance testing requirements for fluid relief rates of a rupture disk.

Rupture disks made in accordance with the present invention have a low $K_r$ in both liquid and gas environments. The $K_r$ rating of a rupture disk is determined through a standardized procedure. In one method, the $K_r$ rating of a particular disk design is determined by bursting three samples of three different sizes of the rupture disk at the minimum pressure rating for the disk. The $K_r$ value for each of the nine burst disks is then determined. Next, the average and the standard deviation of the nine $K_r$ values is determined. The $K_r$ rating for the rupture disk is equal to the average of the nine $K_r$ values plus three times the standard deviation of the nine $K_r$ values. The following test data represents testing done on disks made in accordance with the present invention in a gas environment according to ASME standards:

| Disk Size | Test No. | $K_r$ Value |
|---|---|---|
| 1.0" | 1 | 0.256 |
| 1.0" | 2 | 0.266 |
| 1.0" | 3 | 0.271 |
| 1.5" | 1 | 0.329 |
| 1.5" | 2 | 0.321 |
| 1.5" | 3 | 0.285 |
| 2.0" | 1 | 0.314 |
| 2.0" | 2 | 0.270 |
| 2.0" | 3 | 0.282 |
| Average | | 0.288222 |
| Standard Deviation | | 0.022074 |
| $K_r$ Rating | | 0.354444 |

As shown in the above testing, a rupture disk according to the present invention has a low $K_r$ in a gas environment. While the $K_r$ for a liquid environment may be slightly higher, the present invention nonetheless provides for a low $K_r$ value under liquid conditions. Preferably, the $K_r$ of the rupture disk according to the present invention is less than about 1.6 in both gas and liquid applications. More preferably, the $K_r$ of the rupture disk according to the present invention is less than about 1.0 in both gas and liquid applications. Even more preferably, the $K_r$ of the rupture disk according to the present invention is less than about 0.7 in gas and/or liquid applications.

An additional benefit of the present invention is a rupture disk design that provides low rupture pressures in a liquid application. Conventional non-fragmenting rupture disks are unsuited for low pressure liquid applications since the disks will not open fully in such an application. The rupture disk of the present invention, however, will meet ASME performance standards in liquid applications having operating pressures of under 100 psig.

It will be apparent to those skilled in the art that various modifications and variations can be made in the rupture disk assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief assembly, comprising:
   an inlet support member defining an inlet bore for conducting a pressurized fluid;
   an outlet support member defining an outlet bore for relieving the pressurized fluid;
   a rupture disk having a rupturable portion including a convex surface and a corresponding concave surface defining a dome area and a flange for sealing engagement between the inlet and outlet support members to align the concave surface with the outlet bore and the convex surface with the inlet bore, the rupturable portion including a score line having a first and a second end, the score line creating a line of weakness along which the rupturable portion will tear when the pressurized fluid exceeds a predetermined level; and
   a safety member disposed between the rupture disk and the outlet support member, the safety member including a flange and a hinge having a knuckle extending downwardly into the dome area and extending laterally across the dome area to an outer edge comprising three segments, wherein at least two of the segments are substantially linear, each of the segments are joined at an angle relative to the adjoining segment, and at least one of the segments is positioned inside the area circumscribed by the score line or inside the area circumscribed by an arc connecting the two ends of the score line, the hinge further including a tongue extending from the knuckle into the outlet bore in a direction generally perpendicular to the flange of the safety member.

2. The pressure relief assembly of claim 1, wherein the hinge includes a tongue support extending from the tongue to a point adjacent the outlet support member.

3. The pressure relief assembly of claim 2, wherein the tongue further includes a linear section and the tongue support comprises two flaps extending from opposite sides of the linear section at an obtuse angle.

4. The pressure relief assembly of claim 3, wherein the two flaps are disposed adjacent the outlet support member and form a gap therebetween when the rupture disk is in an unruptured condition.

5. The pressure relief assembly of claim 4, wherein the rupturable portion of the rupture disk contacts the tongue of the hinge after the rupturable portion tears along the score line, thereby deforming the tongue and causing the flaps to engage the outlet support member.

6. The pressure relief assembly of claim 1, wherein the rupturable portion of the rupture disk contacts the tongue of the hinge after the rupturable portion tears along the score line, the tongue deforming to absorb the kinetic energy of the rupturable portion.

7. The pressure relief assembly of claim 1, wherein the shape of the knuckle conforms generally to the contour of the concave surface of the rupturable portion.

8. The pressure relief assembly of claim 1, wherein the hinge further includes a first and a second pocket on opposing sides of the knuckle, the first end of the score line disposed adjacent the first pocket and the second end of the score line disposed adjacent the second pocket.

9. The pressure relief assembly of claim 8, wherein the first and second pockets extend away from the flange of the safety member in the direction of the outlet bore.

10. The pressure relief assembly of claim 1, wherein the safety member includes a stress riser configured to engage the rupturable portion of the rupture disk to ensure the rupturable portion tears when the pressurized fluid exceeds the predetermined level.

11. The pressure relief assembly of claim 10, wherein the stress riser includes at least one stress concentrating point configured to contact the score line in the rupturable portion to ensure the rupturable portion tears along the score line.

12. A rupture disk assembly to be sealed in a pressurized system, comprising:
   a rupture disk having a dome-shaped rupturable portion including a convex surface and a corresponding concave surface forming a dome area, the rupturable portion having a score line creating a line of weakness along which the rupturable portion will tear when the rupturable portion of the rupture disk is exposed to a fluid above a predetermined pressure; and
   a safety member disposed adjacent the concave surface of the rupture disk, the safety member including a flange and a hinge, the hinge having a knuckle extending downwardly into the dome area and extending laterally across the dome area to an outer edge comprising three segments, wherein at least two of the segments are substantially linear, each of the segments are joined at an angle relative to the adjoining segment, and at least one of the segments is positioned inside the area circumscribed by the score line, the hinge further including a tongue extending from the knuckle and into the outlet bore in a direction generally perpendicular to the flange of the safety member.

13. The rupture disk assembly of claim 12, wherein the tongue includes a linear section and two flaps, the two flaps extending from opposite sides of the linear section at an obtuse angle.

14. The rupture disk assembly of claim 13, further comprising an outlet support member having an outlet bore, wherein the two flaps are disposed adjacent the outlet support member and form a gap therebetween when the rupture disk is in an unruptured condition.

15. The rupture disk assembly of claim 14, wherein the rupturable portion of the rupture disk contacts the tongue of the hinge after the rupturable portion tears along the score line, thereby deforming the tongue and causing the flaps to engage the outlet support member.

16. The rupture disk assembly of claim 12, wherein the rupturable portion of the rupture disk contacts the tongue of the hinge after the rupturable portion tears along the score line, the tongue deforming to absorb the kinetic energy of the rupturable portion.

17. The rupture disk assembly of claim 12, wherein the shape of the knuckle conforms generally to the contour of the concave surface of the rupturable portion.

18. The rupture disk assembly of claim 12, wherein the score line includes a first and a second end and the hinge extends laterally across the dome area to a point that is inside the area circumscribed by an arc connecting the two ends of the score line.

19. The rupture disk assembly of claim 18, wherein the hinge further includes a first and a second pocket on opposing sides of the knuckle, the first end of the score line disposed adjacent the first pocket and the second end of the score line disposed adjacent the second pocket.

20. The rupture disk assembly of claim 19, further comprising an outlet support member having an outlet bore, wherein the first and second pockets extend away from the flange of the safety member in the direction of the outlet bore.

21. The rupture disk assembly of claim 12, wherein the safety member includes a stress riser configured to engage the rupturable portion of the rupture disk to ensure the rupturable portion tears when the pressurized fluid exceeds the predetermined level.

22. The rupture disk assembly of claim 21, wherein the stress riser includes at least one stress concentrating point configured to contact the score line in the rupturable portion to ensure the rupturable portion tears along the score line.

23. A rupture disk assembly to be sealed in a pressurized system, comprising:
  a rupture disk having a dome-shaped rupturable portion including a convex surface and a corresponding concave surface forming a dome area, the rupturable portion including a score line having a first and a second end, the score line creating a line of weakness along which the rupturable portion will tear when the rupturable portion of the rupture disk is exposed to a fluid above a predetermined pressure; and
  a safety member disposed adjacent the concave surface of the rupture disk and including a flange and a hinge, the hinge having a knuckle extending downwardly into the dome area and extending laterally across the dome area to a point that is inside the area circumscribed by the score line or inside an arc connecting the two ends of the score line, the hinge further including a first pocket adjacent to the first end of the score line and a second pocket adjacent to the second end of the score line, the first and second pockets configured to contact the area of the rupturable portion adjacent the respective ends of the score line when the rupture disk ruptures.

24. The rupture disk assembly of claim 23, wherein the hinge includes a tongue extending from the knuckle into the outlet bore in a direction generally perpendicular to the flange of the safety member.

25. The rupture disk assembly of claim 24, wherein the first pocket, the second pocket, the knuckle, and the tongue are positioned in a generally straight line about which the rupturable portion bends when the rupture disk ruptures.

26. The rupture disk assembly of claim 24, wherein the rupture disk assembly further includes an inlet support member having an inlet bore and an outlet support member having an outlet bore, the inlet and outlet support members configured to sealingly engage the rupture disk, the hinge including a tongue support extending from the tongue to a point adjacent the outlet support member.

27. The rupture disk assembly of claim 26, wherein the tongue further includes a linear section and the tongue support comprises two flaps, the two flaps extending from opposite sides of the linear section at an obtuse angle.

28. The rupture disk assembly of claim 23, wherein the rupture disk assembly further includes an inlet support member having an inlet bore and an outlet support member having an outlet bore, the first and second pockets extending away from the flange in the direction of the outlet bore.

29. The rupture disk assembly of claim 23, wherein the safety member includes a stress riser configured to engage the rupturable portion of the rupture disk to ensure the rupturable portion tears when the pressure of the pressurized fluid exceeds the predetermined level.

30. The rupture disk assembly of claim 29, wherein the stress riser includes at least one stress concentrating point configured to contact the score line in the rupturable portion to ensure the rupturable portion tears along the score line.

31. A rupture disk assembly to be sealed between an inlet support member having an inlet bore and an outlet support member having an outlet bore, comprising:
  a rupture disk having a dome-shaped rupturable portion including a convex surface and a corresponding concave surface forming a dome area and line of weakness having a first and a second end, the rupture disk tearing along the line of weakness when the rupture disk is exposed to a fluid above a predetermined pressure; and
  a safety member disposed adjacent the concave surface of the rupture disk, the safety member including a flange and a hinge, the hinge having a knuckle extending downwardly into the dome area and extending laterally across the dome area to an outer edge comprising three segments, wherein at least two of the segments are substantially linear, each of the segments are joined at an angle relative to the adjoining segment, and at least one of the segments is positioned inside the area circumscribed by the line of weakness or inside the area circumscribed by an arc connecting the two ends of the line of weakness, the hinge further including a tongue extending away from the knuckle and into the outlet bore.

32. The rupture disk assembly of claim 31, wherein the rupture disk includes a flange surrounding the rupturable portion and a transition area connecting the flange to the rupturable portion.

33. The rupture disk assembly of claim 32, wherein the line of weakness is in the rupturable portion.

34. The rupture disk assembly of claim 32, wherein the line of weakness is in the transition area.

35. A rupture disk assembly to be sealed between an inlet support member having an inlet bore and an outlet support member having an outlet bore, comprising:
  a rupture disk having a dome-shaped rupturable portion including a convex surface and a corresponding concave surface forming a dome area, the rupturable portion having a score line having a first and second end, the score line creating a line of weakness along which the rupturable portion will tear when the rupturable portion of the rupture disk is exposed to a fluid above a predetermined pressure; and
  a safety member disposed adjacent the concave surface of the rupture disk, the safety member including a flange and a hinge, the hinge having a knuckle extending downwardly into the dome area and extending laterally across the dome area to an outer edge comprising three segments, wherein at least two of the segments are substantially linear, each of the segments are joined at an angle relative to the adjoining segment, and at least one of the segments is positioned inside, but directly adjacent to, the area circumscribed by the score line or the area circumscribed by an arc connecting the two ends of the score line, the hinge further including a tongue extending away from the knuckle and into the outlet bore in a direction generally perpendicular to the flange of the safety member.

36. The rupture disk assembly of claim 35, wherein the hinge includes a tongue support extending from the tongue to a point adjacent the outlet support member.

37. The rupture disk assembly of claim 36, wherein the tongue further includes a linear section and the tongue support comprises two flaps extending from opposite sides of the linear section at an obtuse angle.

38. The rupture disk assembly of claim 37, wherein the rupturable portion of the rupture disk contacts the tongue of the hinge after the rupturable portion tears along the score line, thereby deforming the tongue and causing the flaps to contact the outlet support member.

39. The rupture disk assembly of claim 35, wherein the shape of the knuckle conforms generally to the contour of the concave surface of the rupturable portion.

40. The rupture disk assembly of claim 35, wherein the hinge further includes a first and a second pocket on opposing sides of the knuckle, the first end of the score line disposed adjacent the first pocket and the second end of the score line disposed adjacent the second pocket.

41. The rupture disk assembly of claim 40, wherein the first and second pockets extend away from the flange in the direction of the outlet bore.

42. The rupture disk assembly of claim 35, wherein the safety member includes a stress riser configured to engage the rupturable portion of the rupture disk to ensure the rupturable portion tears when the pressurized fluid exceeds the predetermined level.

43. The rupture disk assembly of claim 42, wherein the stress riser includes at least one stress concentrating point configured to contact the score line in the rupturable portion to ensure the rupturable portion tears along the score line.

44. A rupture disk assembly to be sealed between an outlet support member having an outlet bore and a pressurized system, comprising:

a rupture disk having a dome-shaped rupturable portion including a convex surface and a corresponding concave surface forming a dome area, the rupturable portion having a score line having a first and second end, the score line creating a line of weakness along which the rupturable portion will tear when the rupturable portion of the rupture disk is exposed to a fluid above a predetermined pressure; and a safety member disposed adjacent the concave surface of the rupture disk, the safety member including a flange and a hinge, the hinge having a knuckle extending downwardly into the dome area and extending laterally across the dome area and a tongue extending away from the knuckle and into the outlet bore in a direction generally perpendicular to the flange of the safety member, the hinge further including a tongue support projecting from the tongue to a point adjacent the outlet support member.

45. The rupture disk assembly of claim 44, wherein the tongue further includes a linear section and the tongue support comprises two flaps extending from opposite sides of the linear section at an obtuse angle.

46. The rupture disk assembly of claim 45, wherein the rupturable portion of the rupture disk contacts the tongue of the hinge after the rupturable portion tears along the score line, thereby deforming the tongue and causing the flaps to contact the outlet support member.

47. The rupture disk assembly of claim 44, wherein the shape of the knuckle conforms generally to the contour of the concave surface of the rupturable portion.

48. The rupture disk assembly of claim 44, wherein the hinge further includes a first and a second pocket on opposing sides of the knuckle, the first end of the score line disposed adjacent the first pocket and the second end of the score line disposed adjacent the second pocket.

49. The rupture disk assembly of claim 44, wherein the safety member includes a stress riser configured to engage the rupturable portion of the rupture disk to ensure the rupturable portion tears when the pressurized fluid exceeds the predetermined level.

50. The rupture disk assembly of claim 49, wherein the stress riser includes at least one stress concentrating point pointed configured to contact the score line in the rupturable portion to ensure the rupturable portion tears along the score line.

51. A rupture disk assembly to be sealed in a pressurized system, comprising:

a rupture disk having a dome-shaped rupturable portion including a convex surface and a corresponding concave surface forming a dome area, the rupturable portion having an indentation formed at the apex of the dome shape, the rupture disk further including a score line with a first and a second end, the score line creating a line of weakness along which the material of the rupture disk will tear when the rupture disk is exposed to a fluid above a predetermined pressure; and a safety member disposed adjacent the concave surface of the rupture disk, the safety member including a flange and a hinge, the hinge having a knuckle extending downwardly into the dome area and extending laterally across the dome area to an outer edge comprising three segments, wherein at least two of the segments are substantially linear, each of the segments are joined at an angle relative to the adjoining segment, and at least one of the segments is positioned inside the area circumscribed by the score line or inside the area circumscribed by an arc connecting the two ends of the score line, the hinge further including a tongue extending from the knuckle and into the outlet bore in a direction generally perpendicular to the flange of the safety member.

52. The rupture disk assembly of claim 51, wherein the indentation has substantially the same thickness as the rupturable portion of the dome that surrounds the indentation.

53. The rupture disk assembly of claim 51, wherein the score line is in the rupturable portion of the rupture disk.

54. The rupture disk assembly of claim 51, wherein the hinge further includes a first and a second pocket on opposing sides of the knuckle, the first end of the score line disposed adjacent the first pocket and the second end of the score line disposed adjacent the second pocket.

55. The rupture disk assembly of claim 51, wherein the hinge includes a tongue support extending from the tongue towards an outlet safety member of the pressurized system.

56. The rupture disk assembly of claim 55, wherein the rupturable portion of the rupture disk contacts the tongue of the hinge after the rupturable portion tears along the score line, thereby deforming the tongue and causing the tongue support member to engage the outlet support member.

* * * * *

UNITED STATES PATENT AND TRADEMARK OFFICE
CERTIFICATE OF CORRECTION

PATENT NO. : 6,178,983 B1
DATED : January 30, 2001
INVENTOR(S) : Cullinane et al.

It is certified that error appears in the above-identified patent and that said Letters Patent is hereby corrected as shown below:

<u>Title page,</u>
Item [12] under United States Patent, "Culliinane et al." should read -- Cullinane et al. --;
Item [75] line 1, after "Inventors:", "Donall Culliinane" should read -- Donall Cullinane --.

Signed and Sealed this

Twenty-eighth Day of August, 2001

Attest:

NICHOLAS P. GODICI
*Attesting Officer*     *Acting Director of the United States Patent and Trademark Office*